United States Patent
Ejzak (12) 
(10) Patent No.: US 6,389,066 B1
(45) Date of Patent: *May 14, 2002

(54) SYSTEM AND METHOD FOR ADAPTIVE MODIFICATION OF MODULATED AND CODED SCHEMES IN A COMMUNICATION SYSTEM

(75) Inventor: Richard P. Ejzak, Wheaton, IL (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/938,031

(22) Filed: Sep. 21, 1997

(51) Int. Cl.[7] .......................... H04B 3/46; H04B 17/00; H04Q 1/20
(52) U.S. Cl. .................... 375/224; 375/219; 370/252
(58) Field of Search .................. 375/259, 285, 375/377, 219, 260, 225, 224, 220, 262, 265, 341, 227; 371/43.1; 714/786; 370/204, 280, 330, 345, 336, 347, 252

(56) References Cited

U.S. PATENT DOCUMENTS

| | | | | |
|---|---|---|---|---|
| 4,780,883 A | * | 10/1988 | O'Connor et al. | |
| 5,243,428 A | * | 9/1993 | Challapali et al. | 358/167 |
| 5,319,712 A | * | 6/1994 | Finkelstein et al. | 380/44 |
| 5,557,639 A | * | 9/1996 | Heikkila et al. | 375/224 |
| 5,608,763 A | * | 3/1997 | Chiasson et al. | 375/332 |
| 5,721,735 A | * | 2/1998 | Smiroldo | 370/442 |
| 5,758,294 A | * | 5/1998 | Ganesan et al. | 455/561 |
| 5,787,360 A | * | 7/1998 | Johnston et al. | 455/524 |
| 5,793,744 A | * | 8/1998 | Kanerva et al. | 370/209 |
| 5,901,143 A | * | 5/1999 | Rotter et al. | 370/329 |
| 5,909,469 A | * | 6/1999 | Frodigh et al. | 375/302 |
| 5,920,545 A | * | 7/1999 | Rasanen et al. | 370/232 |

* cited by examiner

*Primary Examiner*—Jean Corrielus
(74) *Attorney, Agent, or Firm*—Grossman, Patti & Brill (57) ABSTRACT

A system and method is provided having an adaptive channel coder and modulator, a channel decoder and demodulator connected to the adaptive channel coder and modulator, and a radio link protocol frame and channel decision unit connected to the adaptive channel coder and modulator.

13 Claims, 4 Drawing Sheets

SYSTEM AND METHOD FOR ADAPTIVE MODIFICATION OF MODULATED AND CODED SCHEMES IN A COMMUNICATION SYSTEM

BACKGROUND OF THE INVENTION

1. Field of the Invention

The present invention relates generally to the field of digital communication systems and, more particularly, to the adaptive modification of modulated and coded schemes in a wireless digital communications systems.

2. Description of the Related Art

As the use of wireless communications continues to grow worldwide at a rapid pace, the need for frequency spectrum efficient systems that accommodate both the expanding number of individual users and the new digital features and services such as facsimile, data transmission, and various call handling features has become evident.

Current wireless data systems such as the cellular digital packet data (CDPD) system and the IS-130 circuit switched time division multiple access data system support only low fixed data rates which are insufficient for several applications. Since cellular systems are engineered to provide coverage at the cell boundary, the signal to interference plus noise ratio (SNR) over a large portion of a cell is sufficient to support higher data rates. Adaptive data rate schemes using bandwidth efficient coded modulation currently exist for increasing data throughput over the fading channels encountered in cellular systems. Increased data throughput is accomplished in these schemes by using bandwidth efficient coded modulation schemes with higher information rates. Disadvantageously, a practical problem to using these schemes is their inability to dynamically adjust the coded modulation to adapt to the channel conditions such as fading. Additionally, these schemes use interleaving and link layer retransmission that are not compatible with dynamic adaptation of the coded modulation.

Thus, there is a need for an adaptive scheme which will dynamically adjust the modulation, coding, interleaving, and data link re-transmission procedures to the channel conditions such as fading and provide higher data throughput.

The present invention is directed to overcoming, or at least reducing the effects of, one or more of the problems set forth above.

SUMMARY OF THE INVENTION

In accordance with one aspect of the present invention, a system and method is provided for an adaptive channel coder and modulator, a channel decoder and demodulator connected to the adaptive channel coder and modulator, and a radio link protocol frame and channel decision unit connected to the adaptive channel coder and modulator.

These and other features and advantages of the present invention will become apparent from the following detailed description, the accompanying drawings and the appended claims.

BRIEF DESCRIPTION OF THE DRAWINGS

The advantages of this invention will become apparent upon reading the following detailed description and upon reference to the drawings in which.

DETAILED DESCRIPTION

Figure 1:
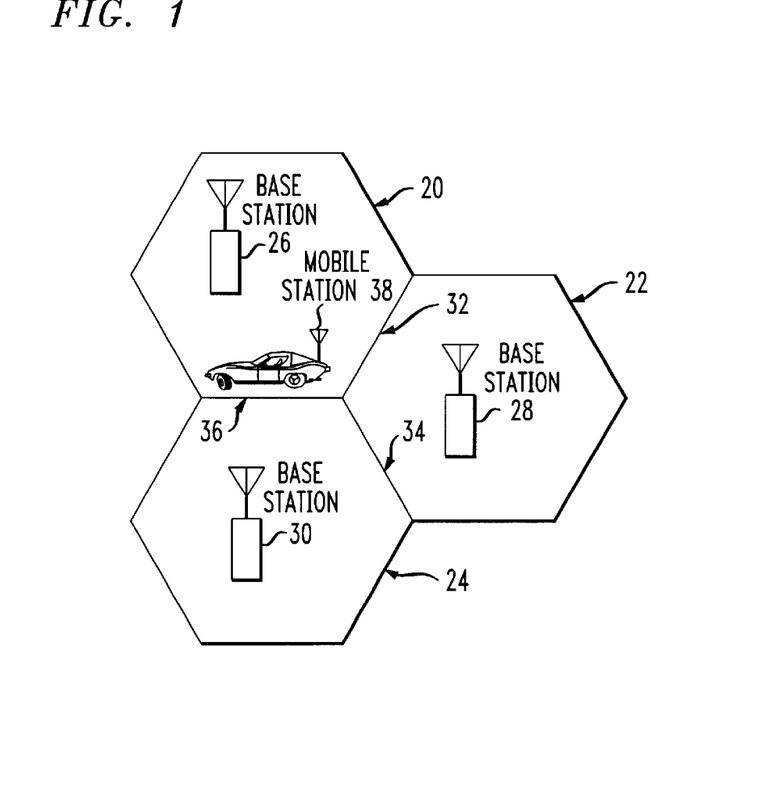
FIG. 1 is a graphical representation of three cell sites within a cluster.

Referring now to the drawings and initially to FIG. 1, a plurality of cells 20, 22, and 24 in a telecommunications system are shown. Consistent with convention, each cell 20, 22, and 24 is shown having a hexagonal cell boundary. Within each cell 20, 22, and 24 are base stations 26, 28, and 30 that are located near the center of the corresponding cell 20, 22, and 24. Specifically, the base station 26 is located within cell 20, base station 28 is located within cell 22, and base station 30 is located within cell 24.

Figure 2:
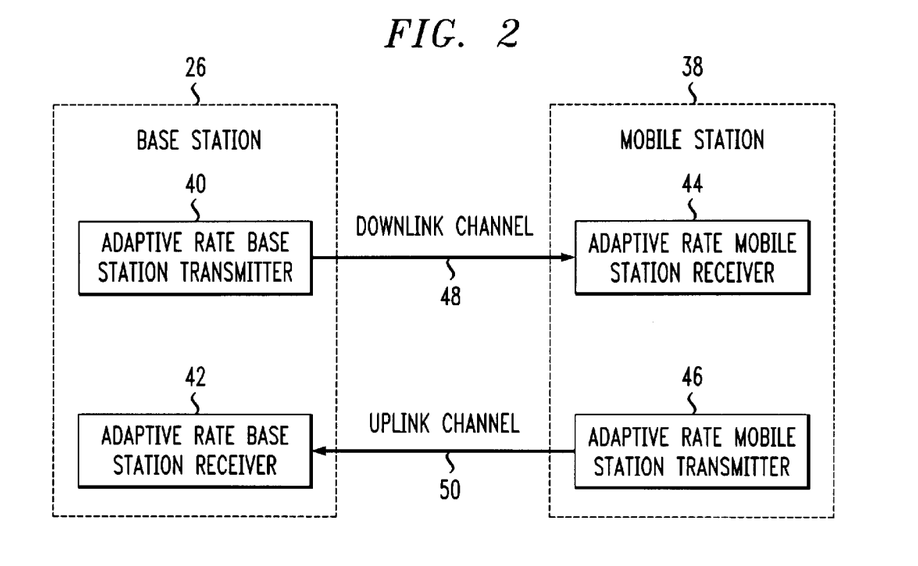
FIG. 2 is a general block diagram of both a base station and mobile station.

The boundaries 32, 34 and 36 separating the cells 20, 22, and 24 generally represent the points where mobile assisted handoffs occurs. As an example, when a mobile station 38 moves away from base station 26 towards an adjacent base station 28, the SNR from the base station 26 will drop below a certain threshold level past the boundary 32 while, at the same time, the SNR from the second base station 28 increases above this threshold as the mobile station 38 crosses the boundary 32 into cell 22. Cellular systems are engineered to provide coverage from each base station up until the cell boundary. Thus, the SNR over a large portion of a cell 20 is sufficient to support higher data rates because the SNR from the base station 26 is greater than the minimum SNR needed to support the data transfer at the boundary 32. FIG. 2 is an example implementation of an adaptive rate system which takes advantage of this support for higher data rates.

FIG. 2 is a block diagram for the schematic of the base station 26 and the mobile station 38 in accordance with the invention. The base station 26 consists of both an adaptive rate base station transmitter 40 and an adaptive rate base station receiver 42. Likewise, the mobile station 38 also consists of both an adaptive rate mobile station receiver 44 and an adaptive rate mobile transmitter 46. Each pair of the transmitter and the receiver, corresponding to either the base station 26 or mobile station 38, are in radio connection via a corresponding channel. Thus, the adaptive rate base station transmitter 40 is connected through a downlink channel 48 to the adaptive rate mobile receiver 44 and the adaptive rate: mobile station transmitter 46 is connected through an uplink channel 50 to the adaptive rate base station receiver 42. This implementation allows for increased throughput between the base station 26 and the mobile station 38 over both the downlink channel 48 and the uplink channel 50 because of the use of adaptive bandwidth efficient coded modulation schemes.

Thus, the information rate may be varied by transmitting at a fixed symbol rate (as in IS-130/IS-136), and changing the bandwidth efficiency (number of information bits per symbol) using a choice of coded modulation schemes. However, coded modulation schemes with different bandwidth efficiencies have different error rate performance for the same SNR per symbol. At each SNR, the coded modulation scheme is chosen which results in the highest throughput with acceptable FER and retransmission delay. Therefore, in accordance with the present invention, adaptation of the coded modulation scheme based on the detected channel quality is achieved.

Figure 3:
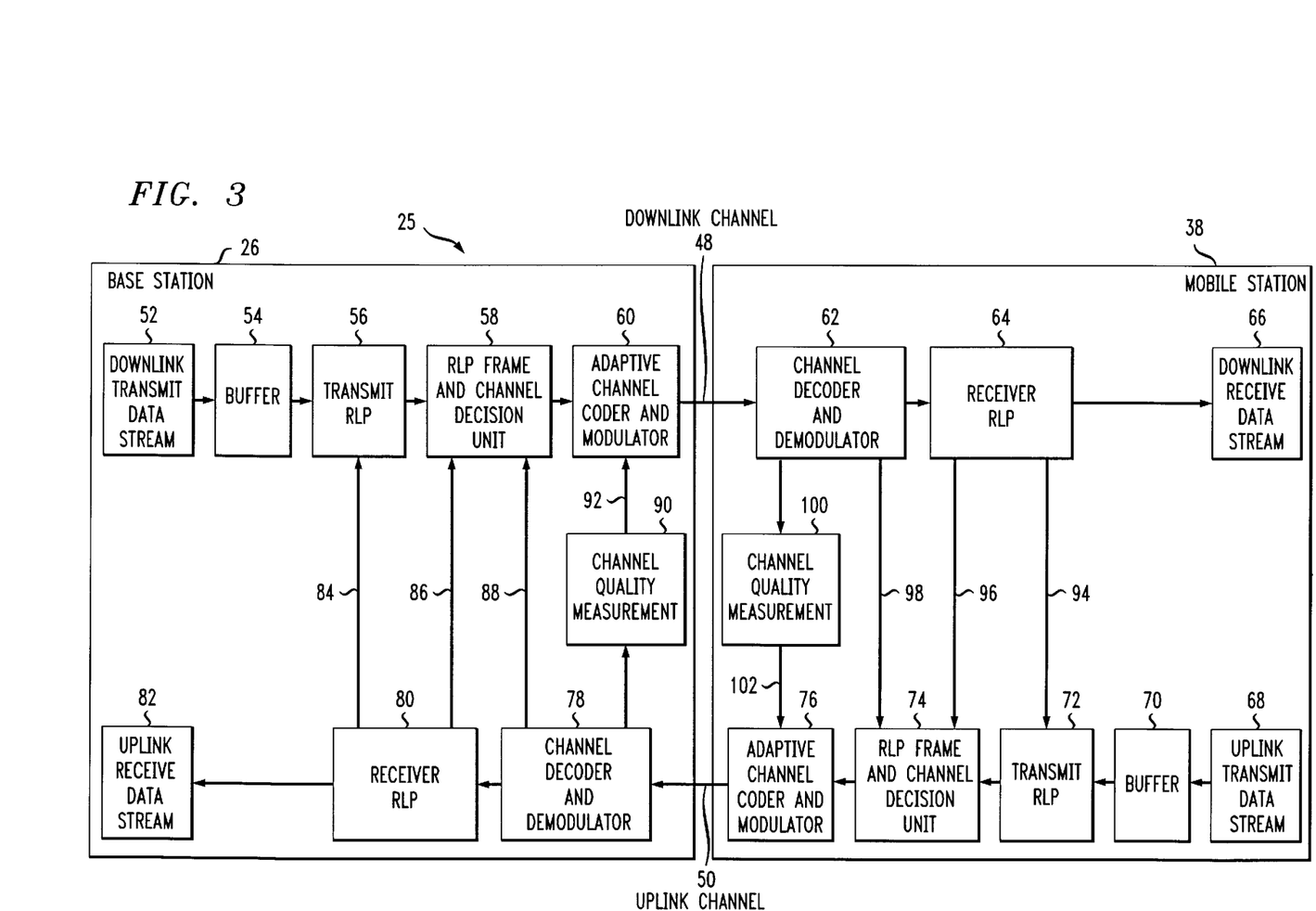
FIG. 3 is a functional detailed block diagram of the base station and the mobile station in accordance with the present invention.

A system 25 in accordance with the present invention is shown in FIG. 3. A block diagram of the base station 26 and mobile station 38 of the system 25 is shown in FIG. 3. FIG. 3 shows two data paths. The first path starts within the base station 26 with a downlink transmit data stream 52 being input into a transmit buffer 54. From the transmit buffer 54 the information is processed through both a transmit radio link protocol (RLP) 56 and a RLP frame and channel decision unit 58 to an adaptive channel coder and modulator 60. The adaptive channel coder and modulator 60 then interleaves, codes, modulates, and transmits the information across the downlink channel 48 to a channel decoder and demodulator 62 which decodes, demodulates, de-interleaves, and outputs the information to a receiver RLP 64. The receiver RLP 64 then processes the information to produce a downlink received data stream 66.

The second path is symmetric to the first. The second path starts within the mobile station 38 with an uplink transmit data stream 68 being input into a transmit buffer 70. From the transmit buffer 70, the information is processed through both a transmit RLP 72 and a RLP frame and channel decision unit 74 to an adaptive channel coder and modulator 76. The adaptive channel coder and modulator 76 then interleaves, codes, modulates, and transmits the information across the uplink channel 50 to a channel decoder and demodulator 78 which decodes, demodulates, de-interleaves, and outputs the information to a receiver RLP 80. The receiver RLP 80 then processes the information to produce an uplink received data stream 82.

Both of the data paths described above include multiple feed back loops. The first feed back loop in the first path (branch 84) is from the receiver RLP 80, in the second path, to the transmit RLP 56 in the first path. The second feed back loop in the first path (branch 86) is from the receiver RLP 80, in the second path, to the RLP frame and channel decision unit 58 in the first path. The third feed back loop in the first path (branch 88) is from the channel decoder and demodulator 78, in the second path, to RLP frame and channel decision unit 58 in the first path. Finally, the forth feed back loop in the first path (branch 92) is from the channel decoder and demodulator 78, through the channel quality measurement unit 90, (both in the second path) to the adaptive channel coder and modulator 60 in the first path.

Similarly, the first feed back loop in the second path (branch 54) is from the receiver RLP 64, in the first path, to the transmit RLP 72 in the second path. The second feed back loop in the second path (branch 96) is from the receiver RLP 64, in the first path, to the RLP frame and channel decision unit 74 in the second path. The third feed back loop in the second path (branch 98) is from the channel decoder and demodulator 62, in the first path, to RLP frame and channel decision unit 74 in the second path. Finally, the forth feed back loop in the second path (branch 102) is from the channel decoder and demodulator 62, through the channel quality measurement unit 100, (both in the first path) to the adaptive channel coder and modulator 76 in the second path.

The system 25 functions as follows. The downlink transmit data stream 52 is input into the transmit buffer 54 which stores the information until it may be properly processed and transmitted. From the transmit buffer 54, the information flows into the transmit RLP circuit 56 which is the transmitting portion of any appropriate data link protocol with automatic repeat request (ARQ) capability. Examples of this include the RLP protocols for the TDMA and GSM systems, and the HDLC class of protocols such as LAPD. The transmit RLP circuit 56 assembles the data from transmit buffer 54 into new RLP frames for transmission and examines the received RLP control frames for the downlink channel data via branch 84 from the receiver RLP circuit 80 to determine if any previously transmitted RLP frames were transmitted in error and need to be retransmitted. The transmit RLP circuit 56 then creates a queue of new RLP frames which are passed to the RLP frame and channel decision unit circuit 58 for subsequent transmission. Additionally, the transmit RLP circuit 56 also creates la queue of RLP frames for retransmission which are passed to the RLP frame and channel decision unit circuit 58, separately from the queue of the new RLP frames, for subsequent retransmission. Each RLP data frame includes, as a minimum, layer 2 data from the buffer circuit 54, a sequence number uniquely identify the relative positioning of the data for reproduction in sequence at the receiver, and a cyclic redundancy code (CRC) to identify any frames in error. Additionally, each RLP frame has .a fixed length determined by the adaptive channel coder and modulator 60.

Next, the information flows from the transmit RLP circuit 56 to the RLP frame and decision unit 58. The RLP frame and channel decision unit 58 accepts RLP frames from three input queues. The first queue is the queue of new RLP frames from the transmit RLP circuit 56. The second queue is the queue of RLP frames for retransmission from transmit RLP circuit 56. And the last queue is the queue of RLP control frame's on branch 86 from the receiver RLP 80. The RLP frame and channel decision unit 58 also accepts the latest branch 88 downlink channel type request from the channel decoder and demodulator circuit 78. For each transmission opportunity at the adaptive channel coder and modulator 60, the RLP frame and channel decision unit 58 passes a downlink channel type designation and an interleaving block to the adaptive channel coder and modulator 60. The value of the downlink channel type designation determines the precise modulation and coding scheme for the layer 1 data in the interleaving block. This interleaving block consists of the data from an integer number of RLP frames selected by the RLP frame and channel decision unit 58 for transmission. The RLP frame and channel decision unit 58 assigns a different priority to each of the three RLP frame queues. At each transmission opportunity, the RLP frame and channel decision unit 58 selects the maximum number of RLP frames that it can send, in priority order, that is consistent with the current value of the branch 88 downlink channel type request from the channel decoder and demodulator circuit 78. If there are fewer RLP frames queued for transmission than can be transmitted with the current value of the branch 88 downlink channel type request, the RLP frame and channel decision unit 58 selects the most robust channel type for transmission that is capable of delivering all outstanding RLP frames. The most robust channel type is the one that is most likely to transmit the interleaving block without error.

The adaptive channel coder and modulator 60 accepts the interleaving block and the downlink channel type designation from the RLP frame and channel decision unit 58 for every opportunity to transmit an interleaving block. An interleaving block of layer 1 data is interleaved over a fixed number (one or more) of time slot(s) for transmission on the downlink channel 48. After interleaving, the data is further coded and modulated according to the downlink channel type designation in one of a fixed number of predetermined formats before the resulting layer 1 data symbols are assigned to the appropriate time slot(s).

The adaptive channel coder and modulator 60 also transmits certain control information in the same time slot(s) that contain the data associated with the interleaving block. This control data may contain information for synchronization of the channel, physical layer control, handoff assistance, slot synchronization, guard and ramp intervals, color code information, etc. This control data is typically interleaved, coded, and modulated in different ways, using symbols in the corresponding time slots not associated with the interleaving block layer 1 data. The IS-136 and GSM systems are examples of systems of this type, with the one exception that they are not adaptive and do not support multiple channel types for the interleaving block data.

There is one new item of control information associated with each interleaving block. This control information is the branch 92 uplink channel type request from the channel quality measurement circuit 90. This branch 92 control information is coded and modulated in a manner consistent with the remainder of the control information so as to achieve a low error rate under most channel conditions. In addition, there is an optional second item of control information associated with each interleaving block. This optional item of control information is the downlink channel type designation that the adaptive channel coder and modulator 60 received from the RLP frame and channel decision unit 58 for the interleaving block currently being transmitted as one or more time slots on the downlink channel 48.

Each time slot is transmitted by the adaptive channel coder and modulator 60 onto the fading downlink channel 48. The channel decoder and demodulator 62 attempts to correctly decode the control information and interleaving block data for each set of time slot(s) associated with an interleaving block. Most of this control information is processed according to procedures defined elsewhere. Whenever the channel decoder and demodulator 62 decodes the uplink channel type request control information, it forwards, this control information to the RLP frame and channel decision unit 74. When the system 25 includes the optional downlink channel type designation control information, the channel decoder and demodulator 62 uses this information to select which method to use to demodulate and decode the symbols in the time slot(s) associated with the interleaving block. If the optional downlink channel type designation control information is not included in the system, the channel decoder and demodulator 62 attempts to demodulate and decode the symbols associated with the interleaving block using each of the possible channel types, in order, until it successfully decodes one or more RLP frames.

Other techniques may be used to identify the channel type of the received interleaving block. When the channel decoder and demodulator 62 successfully decodes an interleaving block, it identifies each RLP frame in the interleaving block, and forwards each RLP frame to the receiver RLP circuit 64. The RLP frames are easily identified since they have fixed length. Finally, the channel decoder and demodulator 62 passes to the channel quality measurement circuit 100 whatever information is needed to perform the channel quality measurement.

The channel quality measurement circuit 100 performs the channel quality measurement algorithm for each received interleaving block to determine the quality of the downlink channel 48. The channel quality measurement circuit 100 selects the target channel type by comparing the value of the channel quality measurement with predetermined threshold values. The threshold values are predetermined to select the optimal channel type and to provide the highest possible data rate under all possible values of the channel quality measurement. The threshold values may be fixed during the design of the system or may be made adjustable by making provision to either broadcast any local variations for the threshold values to all mobile stations, or transmit any variations directly to the affected mobile station as control information. The channel quality measurement circuit 100 forwards through branch 102 the target channel type to the adaptive channel coder and modulator 76 for transmission as the downlink channel type request control information at the next transmission opportunity on the uplink channel 50. This information will shortly be used by the RLP frame and channel decision unit circuit 58 to help determine the channel type designation for the next interleaving block to be transmitted by the adaptive channel coder and modulator circuit 60.

For each RLP frame that the channel decoder and demodulator 62 passes to receiver RLP circuit 64, the receiver RLP circuit 64 identifies RLP control frames and forwards them to the transmit RLP circuit 72, for control of transmission of subsequent new and retransmitted RLP data frames, according to the procedures of the selected ARQ method. For all received RLP data frames, the receiver RLP circuit 64 assembles user data, in sequence, for delivery to an application as the downlink received data stream 66. The receiver RLP circuit 64 follows the procedures of the selected ARQ method to create any necessary control frames for transmission on the uplink channel 50 back to the transmit RLP circuit 56 for control of subsequent RLP data frame transmission on the downlink channel 48.

Circuits 68, 70, 72, 74, 76, 78, 80, 82, and 90 have the same functions as circuits 52, 54, 56, 58, 60, 62, 64, 66, and 100, respectively, except for the transposition of functions related to the downlink channel 48 and the uplink channel 50.

In this example, the channel types are pre-selected during the design of the system 25 to allow optimal RLP performance in the non-overlapping portions of the expected channel quality range of the system 25. They are also selected in such a way that the channel quality measurement procedure selected can accurately identify the correct transition points between the different channel types under the full range of expected vehicle speeds and delay spread conditions. It has been determined experimentally that for the IS-136 system, if one chooses a set of three channel types for the interleaving block layer 1 data that use modulations of 4-DPSK, 8-DPSK, and 16-DPSK, respectively, and all use a rate $\frac{5}{6}$ convolutional code, the optimal transition points under a very wide range of doppler conditions (vehicle speeds) are readily identified by the selected channel quality measurement technique. This is not true of all possible combinations of modulation and coding. Specifically, it is not true for a set of channel types using the same modulation but different coding schemes, such as rate $\frac{7}{8}$, rate $\frac{4}{5}$, and rate $\frac{1}{2}$ convolutional codes, respectively. This invention applies to any combination of channel quality measurement procedure and set of channel types where the transition points can be identified across all conditions of interest (such as vehicle speed and delay spread). One type of channel quality measurement procedure uses a decoder metric for the maximum likelihood path as the measure of the SNR per symbol.

As an example of this procedure, a Viterbi decoder is used as the decoder and the channel quality information is derived from the cumulative Euclidean distance metric corresponding to the decoded trellis path for each block. However, the Euclidean distance metric has large variations from one block to another in the presence of a fading channel thus smoothing, such as averaging, of these variation is required to obtain a good estimate of the metric. A small cumulative Euclidean distance metric would indicate that the received sequence is very close to the decoded sequence. The Euclidean metric maintains a steady level when the SNR of the signal is fixed and increases when the SNR decreases. Additionally, the average Euclidean distance metric does not depend on the mobile speed. Thus, once the Euclidean metric has been obtained it is either mapped to the corresponding SNR in a lookup table or through a linear prediction approach. The linear prediction approach allows the receiver to react faster to the changes of SNR than the direct mapping approach of a lookup table. Such a channel quality measured technique is described in the commonly owned U. S. patent application Ser. No. 08/921,454, titled "SYSTEM AND METHOD FOR MEASURING CHANNEL QUALITY INFORMATION" by Krishna Balachandran, Sanjiv Nanda, Sninivas R. Kadaba and Richard P. Ejzak, filed on Aug. 25, 1997, the disclosure of which is hereby incorporated by reference.

The channel types are also pre-selected during the design of the system 25 to provide for transmission of an integral number of RLP frames in each interleaving block. The effective number of bits per symbol for all the symbols associated with an interleaving block must be related in a simple integer fashion, such as 1 $\frac{2}{3}$, 2 $\frac{1}{2}$, and $^3$ $\frac{1}{3}$ bits/symbol (corresponding to $\frac{5}{6}$ of the numbers 2, 3, and 4, respectively), which, if there are 260 symbols per interleaving block, would allow for transmission of 432, 648, and 864 bits, respectively. Note that these bits/symbol values correspond to the application of a $\frac{5}{6}$ rate convolutional code to 4-DPSK, 8-DPSK, and 16-DPSK, respectively, as in the previous example, since the three modulations without any coding allow for the transmission of 2, 3, and 4 bits/symbol, respectively. In this example, these three channel types would allow transmission of 2, 3 or 4 RLP frames of length 216 bits (27 octets). This invention applies to any set of channel types that allow for transmission of an integral number of RLP frames in each interleaving block.

Figure 4:
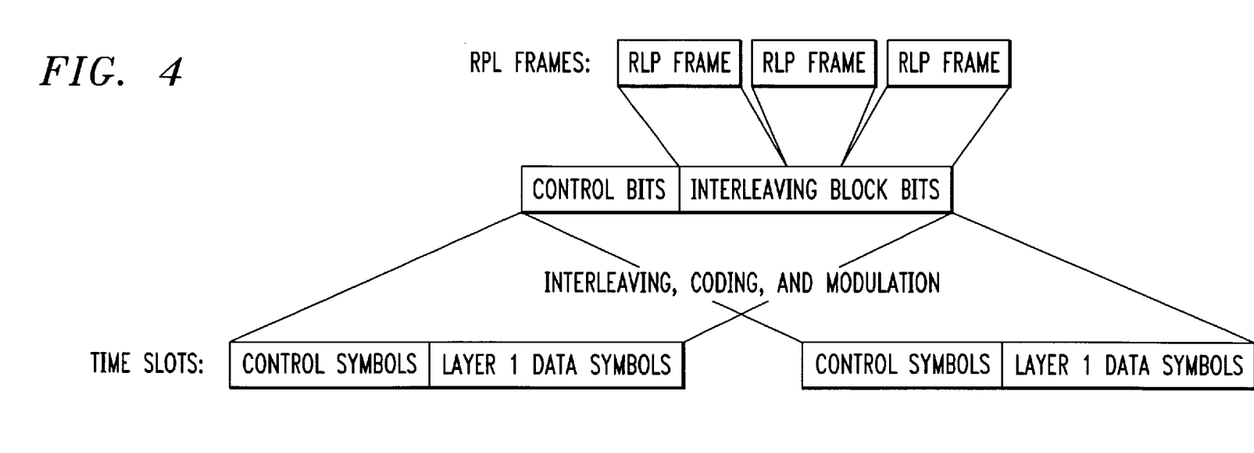
FIG. 4 shows a time slot structure for a general RLP sequence showing the relationship between the RLP frames, interleaving blocks, and time slots.

FIG. 4 shows a time slot structure for a general RLP sequence showing the relationship between the RLP frames, interleaving blocks, and time slots. The RLP frame and channel decision unit 58 places an integral number of fixed size RLP frames in each interleaving block. There are 3 sizes of interleaving blocks in the example implementation of the invention, which can carry 2, 3, or 4 RLP frames, corresponding to the 4-DPSK, 8-DPSK, and 16-DPSK versions of the channel types, respectively. FIG. 4 shows the 8-DPSK channel type with 3 RLP frames per interleaving block. Each interleaving block is interleaved and coded with a rate $\frac{5}{6}$ convolutional code to generate the raw bits for modulation in the 260 layer 1 data symbols in the two time slots. The 260 layer 1 data symbols in the two time slots are modulated at either 4-DPSK, 8-DPSK, or 16-DPSK, with a rate $\frac{5}{6}$ convolutional code, to carry either 2, 3, or 4 RLP frames, respectively, where each RLP frame is 27 octets in length.

Associated with each interleaving block is a set of control information. In this example, the control information is mapped onto symbols in the two time slots different from the layer 1 data symbols. The interleaving, coding and modulation schemes used to map the control information to the control symbols in the time slots are the same for all channel types. Although FIG. 4 shows all control symbols in each time slot gathered together at the beginning of the time slot, the control symbols may be intermixed with the layer 1 data symbols in whatever manner is appropriate to the design of the time slot.

Figure 5:
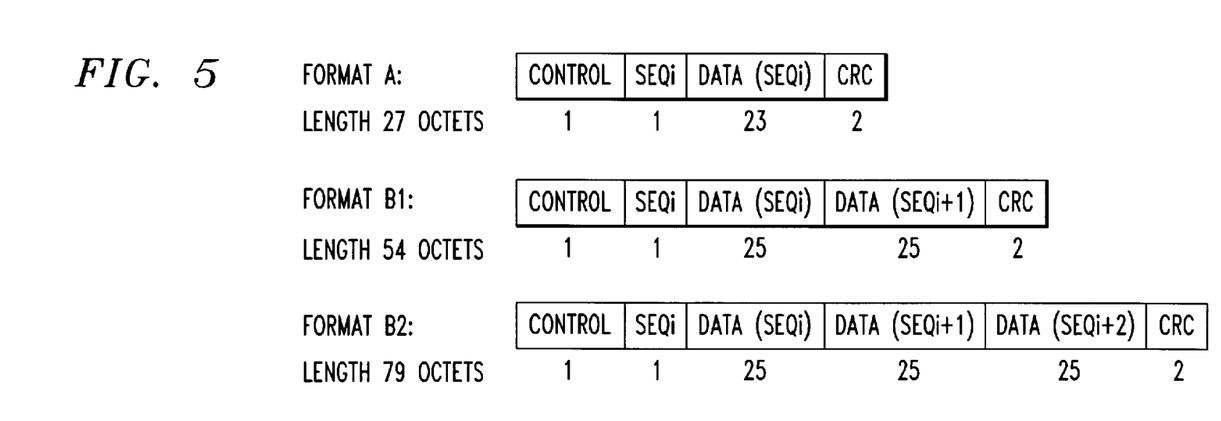
FIG. 5 is block diagram of several RLP frame formats that are consistent with this invention.

FIG. 5 shows several RLP frame formats that are in accordance with the invention. Format A is the standard data link frame format used by all RLP protocols in common use today. All other examples in this application also assume format A for simplicity, but formats B1 and B2 are also applicable in all cases. All field lengths in the figure are given as examples for illustrative purposes only. Using format A with the example channel types, an interleaving block can contain either 2, 3, or 4 format A RLP frames when using the channel types with modulation of 4-DPSK, 8-DPSK, and 16-DPSK, respectively. Note that when using format A RLP frames, the interleaving blocks can carry 46 octets, 69 octets, or 92 octets of RLP user data, respectively. On this type of fading channel, the RLP frame error rate increases with the size of the RLP frames. However, the RLP frame overhead increases significantly with a decrease in the RLP frame size. This tradeoff depends on the system design and is not always clear beforehand. In the example in the figure, by using RLP frame formats B1 and B2, the interleaving blocks could carry 50, 75, and 100 octets of RLP user data, respectively, by using either 1 B1 format RLP frame, 1 B2 format RLP frame, or 2 B1 format RLP frames per interleaving block, respectively. If the improvement in efficiency with formats B1 and B2 is greater than the loss due to an increase in the RLP frame error rate, this option may be a good choice.

The difference between RLP frame format A and RLP frame formats B1 and B2 are in the use of the SEQ field in the header of the RLP frames. With the conventional RLP frame format A, each value of the SEQ field represents all of the data in the user data field of the frame, Its value with respect to other RLP frames determines the relative position of the data in the data stream so that reliable in-sequence delivery of data is assured However with new format B1, the SEQ field value in the header of the RLP frame only represents the data in the first of two equal size blocks of user data within the RLP frame. Similarly for the new format B2, the SEQ field value in the header of the RLP frame only represents the data in the first of three equal size blocks of user data within the RLP frame. After the first block of user data in a format B1 or B2 RLP frame, successive blocks of user data are associated with successive values of the SEQ field, modulo one plus the maximum value of the SEQ field. For purposes of any necessary retransmission, the RLP control frames identify each data block status independently. When retransmitting blocks of user data, the RLP transmitter may be forced to occasionally retransmit user data blocks that have already been acknowledged, introducing an inefficiency into this method. This inefficiency should be taken into account in performing a tradeoff between the two methods. Under the correct circumstances, however, there is a significant gain.

As previously explained, current cellular systems are designed to achieve a desired SNR over a major part of a cell. This SNR is typically 17 dB over 90% of the cell. As a result, the SNR is much greater than 17 dB over a significant part of a cell and higher data rates are possible. Therefore, the throughput may be increased if the transmitter matches the data rate to the received SNR. The symbol rate remains the same, but the data rate is changed by using coding schemes with higher bandwidth efficiency.

As an example, three different data rates may be used for a modified version of IS-136. These data rates may be achieved by using coding and modulation schemes that have different bandwidth efficiencies. Data rates of 9.6 kb/s, 14.4 kb/s and 19.2 kb/s may be achieved on a full rate channel by using a 5/6 rate convolutional code in conjunction with 4-DPSK, 8-DPSK or 16-DPSK. The frame error rate and throughput performance for this example scheme is shown below.

Figure 6:
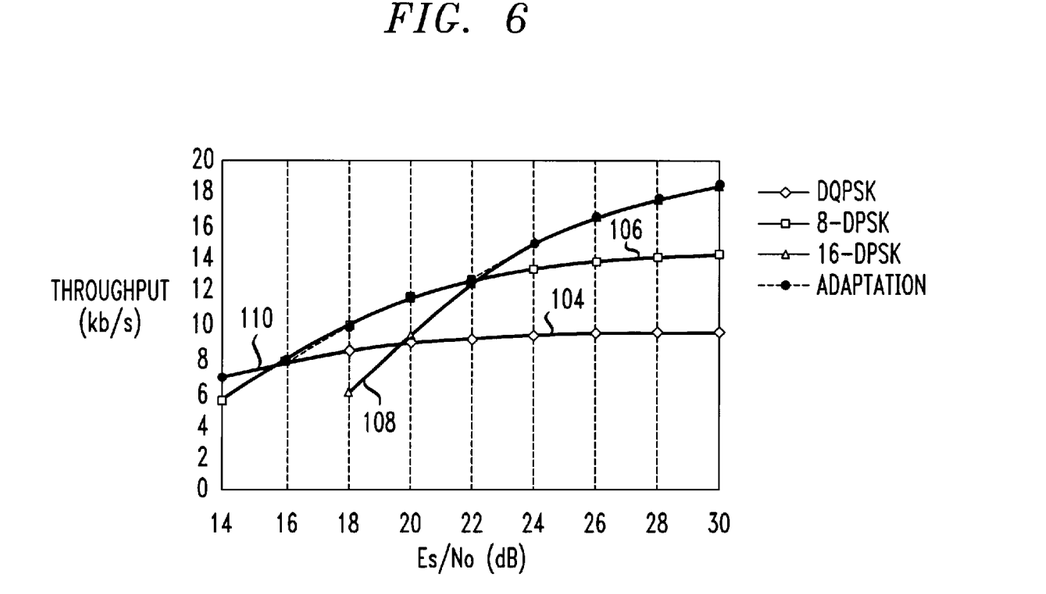
FIG. 6 illustrates a graph having four curves, with the vertical scale representing the data transmitted in kbit per second and the horizontal scale representing the SNR in dB for mode adaptation for $f_dT=0.0012$.

FIG. 6 illustrates a graph having four curves, with the vertical scale representing the data transmitted in kbit per second and the horizontal scale representing the SNR in dB. This set of curves shows the throughput performance of this example of the invention for flat Rayleigh fading with $f_d T=0.0012$. $f_d$ represents the Doppler frequency and T denotes the symbol time. Curve 104 shows throughput with a 4-DPSK based channel type. Curve 106 shows throughput with an 8-DPSK based channel type. Curve 108 shows throughput with a 16-DPSK based channel type. And finally, curve 110 is the resulting performance of the adaptation scheme for this example. The thresholds for transitioning from one scheme to the next were chosen to be 17 dB and 23 dB based on the delay and throughput tradeoffs for this example. Thus, the scheme with the best throughput is chosen for each SNR, and the adaptation scheme performs consistently well for all Doppler frequencies.

Figure 7:
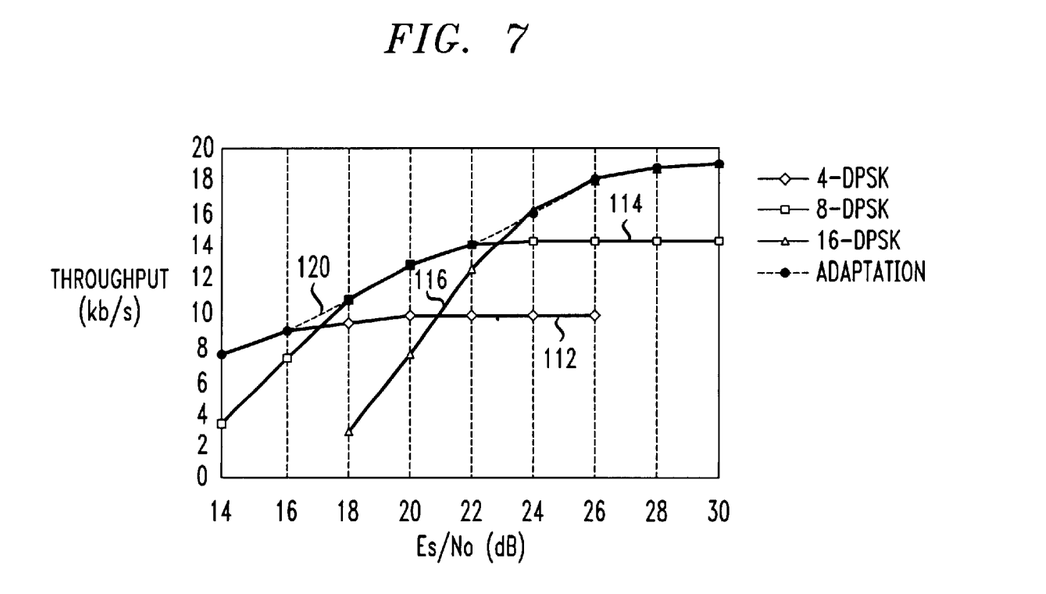
FIG. 7 illustrates a graph having four curves, with the vertical scale representing the data transmitted in kbit per second and the horizontal scale representing the SNR in dB for mode adaptation for $f_dT=0.0069$.

FIG. 7 illustrates a graph having four curves, with the vertical scale representing the data transmitted in kbit per second and the horizontal scale representing the SNR in dB. This set of curves shows the throughput performance of the same! example of the invention for flat Rayleigh fading with $f_d T=0.0069$. Here, curve 112 shows throughput with a 4-DPSK based channel type. Curve 114 shows throughput with an 8-DPSK based channel type. Curve 116 shows throughput with a 16-DPSK based channel type. And finally, curve 118 is the resulting performance of the adaptation scheme for this example. The thresholds for transitioning from one scheme to the next were again chosen to be 17 dB and 23 dB based on the same delay and throughput tradeoffs. Again, the scheme with the best throughput is chosen for each SNR, and the adaptation scheme performs consistently well.

The above examples have described a method of RLP control via RLP control frames, but the invention is also applicable to other methods of communicating RLP control information 84, 86, 94, 96 between the four circuits 56, 64, 72, 80 associated with RLP transmission on the downlink channel 48 and the uplink channel 50. Specifically, this invention is also applicable to systems where the RLP control information is encoded either directly or indirectly as an item of control information within the time slot(s) associated with an interleaving block on channel 1, channel 2, or both channel 1 and channel 2. An example of such a channel is the IS-136 digital control channel which uses such control information to acknowledge successful reception of individual blocks of data.

In summary, a system and method is provided for adaptively changing the modulation schemes of a communication system which comprises a transmitter adaptive channel encoder and modulator connected across a communications channel to a receiver channel decoder and demodulator, where the encoding and modulation schemes of the transmitter adaptive channel encoder and modulator are controlled by a radio link protocol frame and channel decision unit.

While the specification in this invention is described in relation to certain implementations or embodiments, many details are set forth for the purpose of illustration. Thus, the foregoing merely illustrates the principles of the invention. For example, this invention may have other specific forms without departing from its spirit or essential characteristics. The described arrangements are illustrative and not restrictive. To those skilled in the art, the invention is susceptible to additional implementations or embodiments and certain of the details described in this application can be varied considerably without departing from the basic principles of the invention. It will thus be appreciated that those skilled in the art will be able to devise various arrangements which, although not explicitly described or shown herein, embody the principles of the invention and are thus within its spirit and scope.

What is claimed is:

1. A communication system using radio link protocol frames to transmit a data stream, comprising:

a first adaptive channel coder and modulator in which the first adaptive channel coder and modulator uses a combined header for transmitting at least one of the radio link protocol frames;

a channel decoder and demodulator operably coupled to the first adaptive channel coder and modulator;

a channel quality measurement circuit, operably coupled to the channel decoder and demodulator, that generates a cumulative Euclidean distance metric and determines a channel type request based on the cumulative Euclidean distance metric, and passes the channel type request to a second adaptive channel coder and modulator; and a radio link protocol frame and channel decision unit connected to the second adaptive channel coder and modulator.

2. The communication system of claim 1, wherein the radio link protocol frames have a fixed length determined by the first adaptive channel coder and modulator.

3. The communication system of claim 1, wherein the combined header includes a sequence number that represents a relative position within the data stream of data in a user data field in at least one of the radio link protocol frames within the data stream.

4. The communication system of claim 1, wherein a value of a sequence number of at least one of the radio link protocol frames relative to another one of the radio link protocol frames represents a relative position within the data stream of data in a user data field.

5. The communication system of claim 1, wherein a relative position within the data stream of the data in a user data field is associated with successive values of a sequence number.

6. The communication system of claim 1, further comprising a channel quality measurement circuit coupled to the adaptive channel coder and modulator.

7. A method for adaptively modifying a communication signal having a modulation scheme and a coding scheme in a communication system, the method comprising the steps of;

establishing the modulation scheme and coding scheme of the communication signal with a first adaptive channel coder and modulator;

transmitting the communication signal from the first adaptive channel coder and modulator to a channel decoder and demodulator;

transmitting a channel type request from the channel decoder and demodulator to a radio link protocol frame and channel decision unit that is coupled to a second adaptive channel coder and modulator;

determining control information for the communication signal with a channel quality measurement circuit that is in signal communication with the channel decoder and demodulator, wherein the step of determining comprises determining a decoder metric to generate a maximum likelihood path, generating a cumulative Euclidean distance metric corresponding to a decoded trellis path, calculating the channel type request based on the cumulative Euclidean distance metric, and passing the channel type request to the second adaptive channel coder and modulator; and modifying the modulation scheme and coding scheme of the communication signal with the second adaptive channel coder and modulator in response to the channel type request.

8. The method of claim 7, wherein the maximum likelihood path is a measure of the signal to interference plus noise ratio per symbol.

9. A communication system comprising:

a first adaptive rate channel coder and modulator arranged and constructed to transmit, according to a first channel type, at least one radio link protocol frame on a channel;

a channel decoder and demodulator arranged and constructed to receive the at least one radio link protocol frame and to determine the first channel type;

a channel quality measurement circuit, operably coupled to the channel decoder and demodulator, wherein the channel quality measurement circuit is arranged and constructed to determine a channel quality measurement for the at least one radio link protocol frame, to pass a channel type request for a second channel type, based on the channel quality measurement, to a second adaptive rate channel coder and modulator, and to identify transition points between different channel types.

10. The communication system of claim 9, further comprising a decision unit arranged and constructed to determine the second channel type.

11. The communication system of claim 9, wherein the channel quality measurement circuit is further arranged and constructed to generate, as the channel quality measurement, a cumulative Euclidean distance metric and to determine the second channel type based on the cumulative Euclidean distance metric.

12. The communication system of claim 9, wherein the first adaptive rate channel coder and modulator are arranged and constructed to utilize a combined header for transmitting at least one of the radio link protocol frames.

13. The communication system of claim 12, wherein the combined header includes a sequence number representing a relative position of data in a user data field in at least one of the radio link protocol frames relative to another one of the radio link protocol frames and represents a relative position within the data stream of the data in the user data field.

* * * * *